(12) United States Patent
Carlino

(10) Patent No.: US 10,578,174 B1
(45) Date of Patent: Mar. 3, 2020

(54) RADIAL ACTUATION OF DISENGAGEMENT FOR WEDGE CLUTCH

(71) Applicant: SCHAEFFLER TECHNOLOGIES AG & CO. KG, Herzogenaurach (DE)

(72) Inventor: Ryan Carlino, Charlotte, NC (US)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 44 days.

(21) Appl. No.: 16/122,170

(22) Filed: Sep. 5, 2018

(51) Int. Cl.
*F16D 41/063* (2006.01)
*F16D 13/16* (2006.01)

(52) U.S. Cl.
CPC ............ *F16D 41/063* (2013.01); *F16D 13/16* (2013.01)

(58) Field of Classification Search
CPC ......... F16D 41/063; F16D 41/04; F16D 41/20
See application file for complete search history.

(56) References Cited

U.S. PATENT DOCUMENTS

| | | | | |
|---|---|---|---|---|
| 2015/0152922 A1* | 6/2015 | Lee | ........................ | F16D 13/14 192/66.1 |
| 2017/0227064 A1* | 8/2017 | Ince | ........................ | F16D 13/26 |
| 2017/0227065 A1* | 8/2017 | Ince | ........................ | F16D 13/06 |
| 2017/0356505 A1 | 12/2017 | Lee | | |
| 2018/0291968 A1* | 10/2018 | Samie | ........................ | F16D 15/00 |
| 2019/0101172 A1* | 4/2019 | Ince | ........................ | B60K 23/08 |

OTHER PUBLICATIONS

U.S. Appl. No. 15/916,781, filed Mar. 9, 2018.

* cited by examiner

*Primary Examiner* — Timothy Hannon
(74) *Attorney, Agent, or Firm* — Brooks Kushman P.C.

(57) ABSTRACT

A wedge clutch includes a first race rotatable about an axis and having first tapered surfaces annularly arranged about the axis, and a second race rotatable about the axis and concentric with the first race, the second race having a circumferential groove. A plurality of wedge segments are annularly arranged about the axis, each wedge segment having a second tapered surface contacting one of the first tapered surfaces. A plurality of pawls extend radially through at least a portion of either the first race or the second race. Each pawl is circumferentially aligned with a respective gap between two adjacent wedge segments. An actuating ring is configured to move axially along the axis. Axial movement of the actuating ring engages the pawls to force each pawl radially into the respective gap to separate the two adjacent wedge segments.

20 Claims, 3 Drawing Sheets

RADIAL ACTUATION OF DISENGAGEMENT FOR WEDGE CLUTCH

TECHNICAL FIELD

The present disclosure relates to a switchable wedge clutch for selectively transferring torque from one rotating shaft to another shaft.

BACKGROUND

Various clutches are known in the art for transferring torque or rotational energy from one shaft to another. A dog clutch is one known example. Wedge clutches are being developed as an alternative structure for coupling an input shaft to an output shaft. A wedge clutch may include an inner race extending from or connected to one of the shafts, and an outer race extending from or connected to the other of the shafts. A wedge plate or wedge segments are radially disposed between the inner and outer races and is configured to radially engage the inner and outer races when the clutch is locked to transmit power from the input shaft to the output shaft.

SUMMARY

In one embodiment, a switchable wedge clutch includes an inner race extending about an axis and having an outer surface defining a plurality of grooves, and an outer race having an inner surface defining a plurality of tapered regions. A plurality of wedge segments are provided, with each wedge segment having an inner surface moveable within the grooves and circumferentially about the inner race, and each wedge segment having a tapered outer surface configured to engage and slide relative to the tapered regions of the inner surface of the outer race. A plurality of pawls are arranged about the axis and extending through the inner surface of the outer race, each pawl being circumferentially aligned with a gap between two adjacent wedge segments. An actuating ring has one or more axial extensions. Axial movement of the actuating ring causes the one or more axial extensions to force the pawls radially inwardly to separate the two adjacent wedge segments.

In another embodiment, a wedge clutch includes a first race rotatable about an axis and having first tapered surfaces annularly arranged about the axis, and a second race rotatable about the axis and concentric with the first race, the second race having a circumferential groove. A plurality of wedge segments are annularly arranged about the axis, each wedge segment having a second tapered surface contacting one of the first tapered surfaces. A plurality of pawls extend radially through at least a portion of either the first race or the second race. Each pawl is circumferentially aligned with a respective gap between two adjacent wedge segments. An actuating ring is configured to move axially along the axis. Axial movement of the actuating ring engages the pawls to force each pawl radially into the respective gap to separate the two adjacent wedge segments.

In yet another embodiment, a wedge clutch includes an inner race having an outer surface defining a circumferential groove, and an outer race having an inner surface defining a plurality of ramped surfaces. A plurality of wedge segments are disposed radially between the inner race and the outer race. Two adjacent wedge segments define a gap therebetween. Each wedge segment has a circumferential inner surface configured to slide along the circumferential groove, and a tapered outer surface configured to slide along a respective one of the ramped surfaces during engagement and disengagement of the clutch. A plurality of pawls are disposed about the wedge segments, each wedge segment axially and radially aligned with a respective one of the gaps. An actuator moveable in an axial direction. The actuator has one or more axial end surfaces configured to engage the pawls such that axial movement of the actuator forces the pawls radially inwardly into the gap.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Directional terms used herein are made with reference to the views and orientations shown in the exemplary figures. A central axis is shown in the figures and described below. Terms such as "outer" and "inner" are relative to the central axis. For example, an "outer" surface means that the surface faces away from the central axis, or is outboard of another "inner" surface. Terms such as "radial," "diameter," "circumference," etc. also are relative to the central axis. The term "axial" can mean extending along the center axis, or extending in a direction parallel to the center axis. The term "radial" can mean a direction perpendicular to the axial direction. The term "circumferential" can mean a direction about the axis, like a circumference of a circle.

Figure 1:
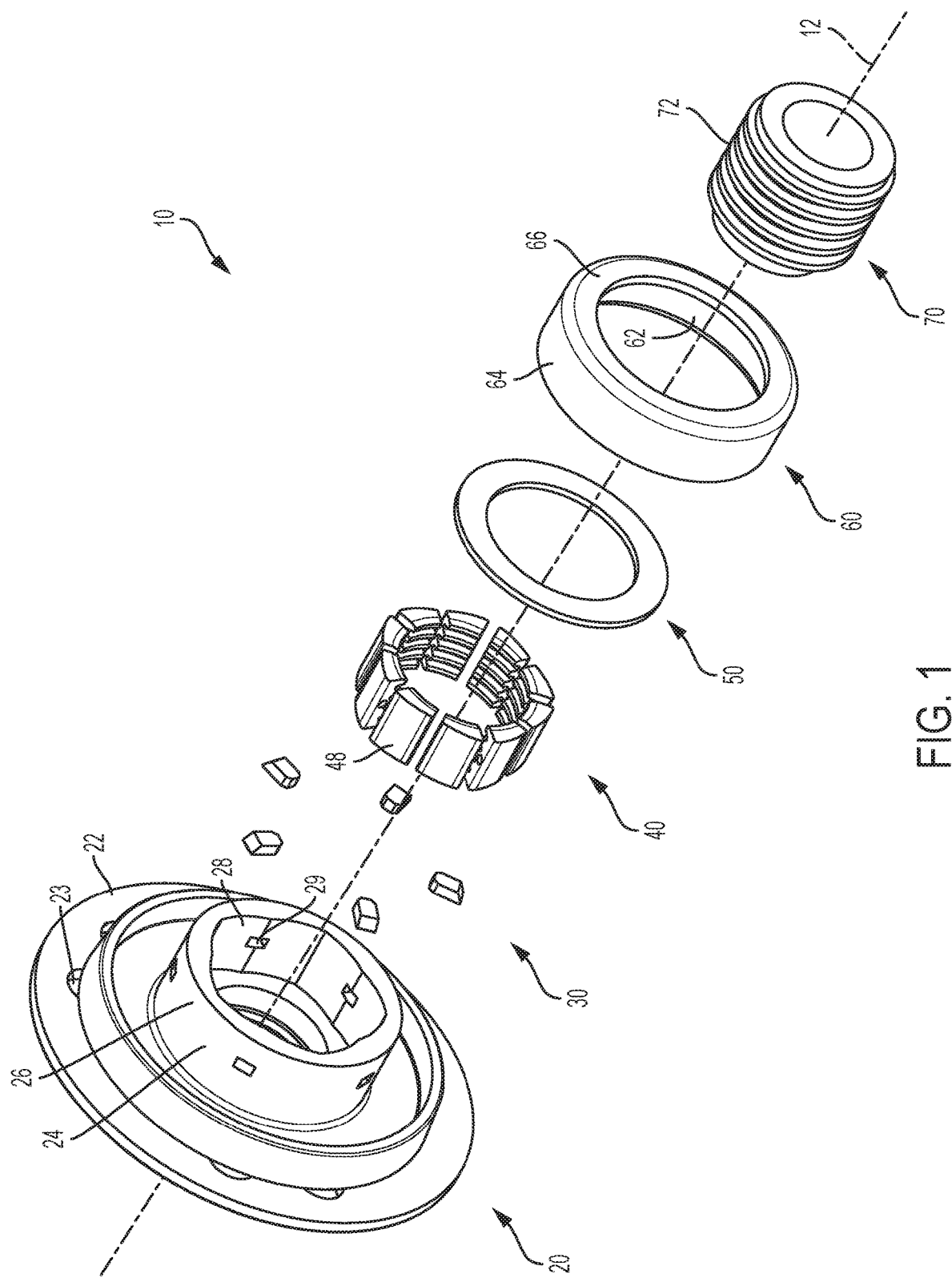
FIG. 1 is an exploded perspective view of a wedge clutch with an axially-moveable actuation ring and radially-moveable pawls for engaging and disengaging the wedge clutch, according to one embodiment.

FIG. 1 is an exploded perspective view of a switchable cylindrical wedge clutch or clutch assembly, generally referred to as a wedge clutch 10. The wedge clutch 10 includes the following components that are arranged about a central axis 12 and will be described in more detail below: a carrier 20, a plurality of pawls 30, a plurality of wedge segments or wedge plate segments 40, a cover 50, an actuation ring 60, and a hub 70.

The carrier 20 may be mounted to a first shaft (not shown) that receives or transmits torque when the wedge clutch 10 is locked. For example, the carrier 20 may include a base 22 mounted to the first shaft via fasteners (e.g., bolts, screws, etc.) that extend through apertures 23 that extend through the base. This can non-rotatably fasten the carrier 20 to the first shaft such that the two components rotate together.

The carrier 20 may include an outer race 24 extending axially from the base 22. The outer race 24 defines a generally cylindrical outer surface 26 and an inner surface having a plurality of ramped surface features 28. The ramped surface features 28 may be referred to as ramped surfaces, tapered surfaces, or the like. The ramped surfaces 28 create an inner surface that is not generally cylindrical. Instead, each ramped surface is ramped or tapered relative to a circumferential direction such that a center point of the curvature of each ramped surface is not located on the central axis 12. The inner surface of the outer race 24 may have a plurality of valleys and a plurality of peaks or apexes radially inward from the valleys, wherein each adjacent ramped surface 28 is tapered or ramped in opposing directions.

The outer race 24 also defines a plurality of apertures 29 extending entirely therethrough, from the outer surface 26 to the inner surface. The apertures 29 are sized and configured to receive the pawls 30, described further below. Each aperture 29 is configured to receive a respective one of the pawls 30 in a sliding engagement, in which each pawl 30 can move radially inward and outward through a respective one of the apertures 29. Each aperture 29 may be axially and radially aligned with a respective one of the peaks or valleys at the intersection of two adjacent ramped surface 28.

The wedge segments 40 are annularly arranged about the axis 12. The wedge segments 40 are separate and spaced from each other. In another embodiment not illustrated herein, the wedge segments 40 are connected or bound to one another by a spring or plate, for example. Therefore, the wedge segments 40 may also be referred to as wedge plate segments.

As shown in FIG. 1, but may be seen with more clarity in FIGS. 2-5, each wedge segment 40 has an inner surface 42 defining a plurality of surface features 44. The surface features 44 extend radially inwardly, and are sized and configured to fit within grooves 72 defined in the outer surface of the inner race or hub 70. The grooves 72 can provide or act as an inner race for the wedge clutch. In one embodiment, the grooves 72 are cylindrical grooves spaced axially from one another along the hub 70. The surface features 44 may likewise be axially spaced from one another along each respective wedge segment 40, allowing each wedge segment 40 to slide circumferentially along the hub 70 in the grooves 72. The surface features 44 may be projections or teeth that have radially-inward ends 46 that are tapered or ramped relative to the radial direction.

While multiple surface features 44 or teeth are illustrated on each wedge segment, and multiple grooves 72 are illustrated on the hub, in another embodiment only one surface feature or tooth and only one groove may be provided. Having multiple teeth and grooves (five of such teeth and grooves in the illustrated embodiment) may be provided to increase the torque capabilities, strength and durability of the wedge clutch.

The surface features 44 therefore allow the wedge segments 40 to collectively radially expend and contract while still being disposed in the grooves 72 of the hub 70. In particular, the wedge segments 40 may each have an outer surface 48 that is tapered or ramped relative to the circumferential direction, similar to the ramped surfaces 28 of the outer race 24. Each tapered or ramped outer surface 48 engages a respective one of the ramped surfaces 28 in a sliding manner, such that each wedge segment 40 can slide along the ramped surfaces 28. In doing so, each wedge segment can move slightly radially inwardly and outwardly.

In one embodiment, and as will be further described below, the wedge segments 40 can assume a first position (or radially inward position or constricted position) that wedges the wedge segment 40 between the hub 70 and the outer race 24 to lock the inner race to the outer race. This allows the inner race to be locked to rotate with the outer race in both rotational directions such that torque can be transmitted through the wedge clutch 10 in both directions. The carrier 20 can be non-rotatably coupled to a first shaft, and the hub 70 can be non-rotatably coupled to a second shaft such that torque transmits between both shafts. In this configuration, it can be said that the wedge clutch assumes a locked mode of operation. The wedge segments 40 can then assume a second position (or radially outward position or expanded position) in which the inner surface features 44 slide circumferentially along the grooves 72 and the outer surface 48 slides radially outwardly along the ramped surfaces 28 to unwedge the wedge segments 40 from between the hub 70 and the outer race 24 to unlock the inner race from the outer race. This allows freewheeling in at least one rotational direction between the inner and outer races. In this configuration, it can be said that the wedge clutch 10 assumes an unlocked mode of operation.

The cover 50 can engage or contact an axial end of both the outer race 24 and the wedge segments 40. This can help axially contain the and align the outer race 24 and the wedge segments 40.

In some wedge clutches, an axial actuator is provided that travels axially between the wedge segments to force separation of the wedge segments. The circumferential space available for the wedge segments may be limited by the space that is necessary for the axial actuator to fit between the wedge segments. Also, when actuated from an axial actuator at one end of the wedge segments, the end of the wedge segment that receives the actuator may be subject to higher forces or stresses than the other axial end of the wedge segments. The higher stress concentrations can lead to fatigue.

Therefore, according to embodiments described herein, the wedge clutch 10 can be actuated and switched between operating modes by radial actuation. Radial actuators such as pawls 30, when actuated, can move in the radial direction to switch modes of the wedge clutch.

Figure 3:
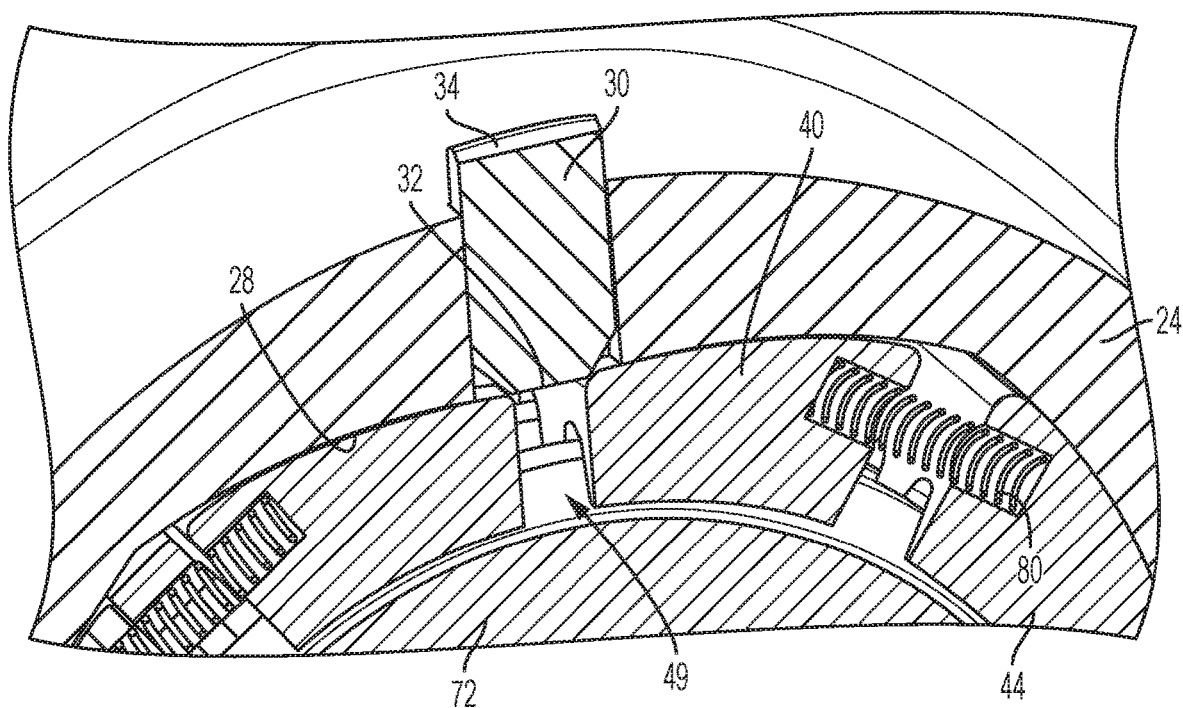
FIG. 3 is a cross-sectional view of the wedge clutch of FIG. 2, with the cross-section taken through one of the pawls.
Figure 5:
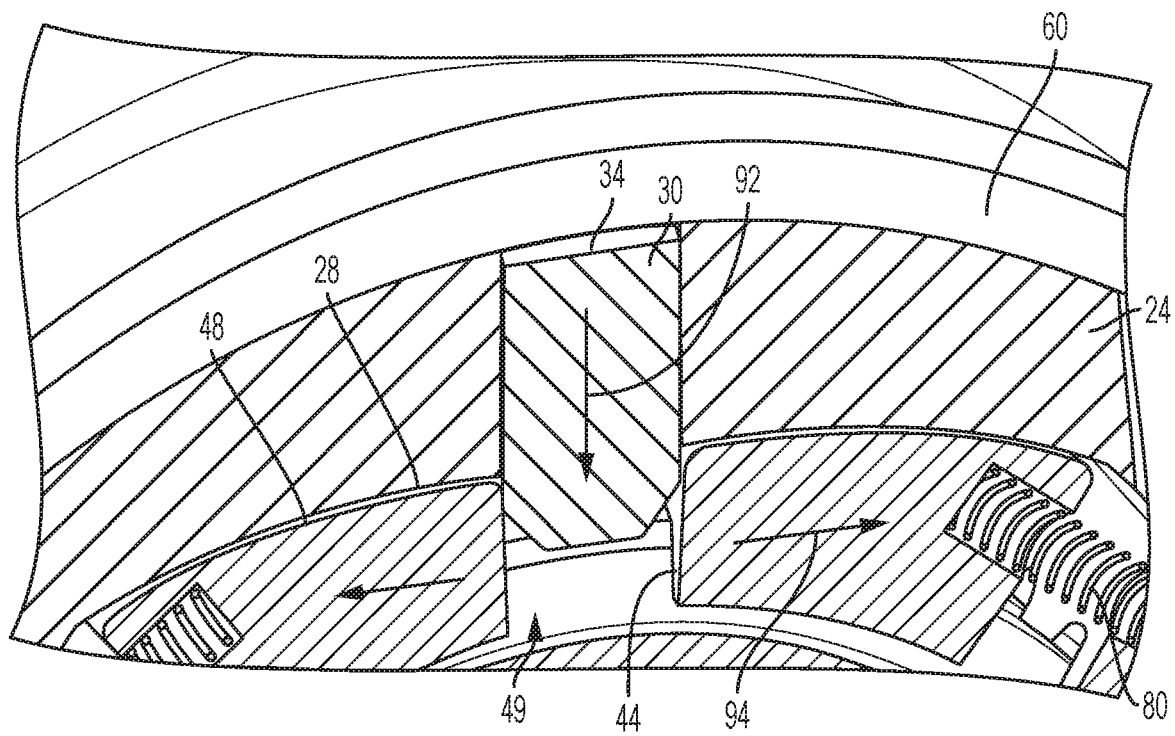
FIG. 5 is a cross-sectional view of the wedge clutch of FIG. 4, with the cross-section taken through one of the pawls.

In one embodiment, a plurality of pawls 30 are arranged about the axis 12 annularly. Each pawl 30 has an inner surface 32 and an outer surface 34. Each pawl may be axially and radially aligned with a gap 49 defined between two adjacent wedge segments 40. During actuation, the pawls 30 can travel radially inwardly into the gaps 49. This causes the pawls 30 to contact the two adjacent wedge segments 40 and separate the two adjacent wedge segments from one another. This forces the wedge segments 40 to travel radially outwardly along the ramped surfaces 28 of the outer race, unwedging the wedge segments 40 from the inner race and outer race and unlocking the wedge clutch 10. As can be seen in FIGS. 3 and 5, the inner surface 32 of each pawl 30 may be tapered or chamfered relative to the circumferential direction to facilitate a gradual separation of the adjacent wedge segments 40 as the pawl 30 is driven into the gap 49.

The actuating ring 60 is provide for linear movement, forcing axial movement of the pawls 30. In one embodiment, the actuating ring 60 is generally cylindrical, having a cylindrical inner surface 62 and a cylindrical outer surface 64. The actuating ring 60 is configured to slide in the axial direction in response to activation from a power source such as hydraulic pressure, electrical energy, etc. that is not shown. When the actuating ring 60 is actuated, it can slide axially with its inner surface 62 sliding along the outer surface 26 of the outer race 24. The actuating ring 60 can also have an end flange 66 that can contact the cover 50 to limit axial movement of the actuating ring 60. At an opposing end from the end flange 66, the actuating ring may have a tapered end surface 68 that engages the outer surface 34 of the pawls, which may also be tapered. This forces a gradual radial movement of the pawls as the actuating ring 60 is moved axially.

Figure 2:
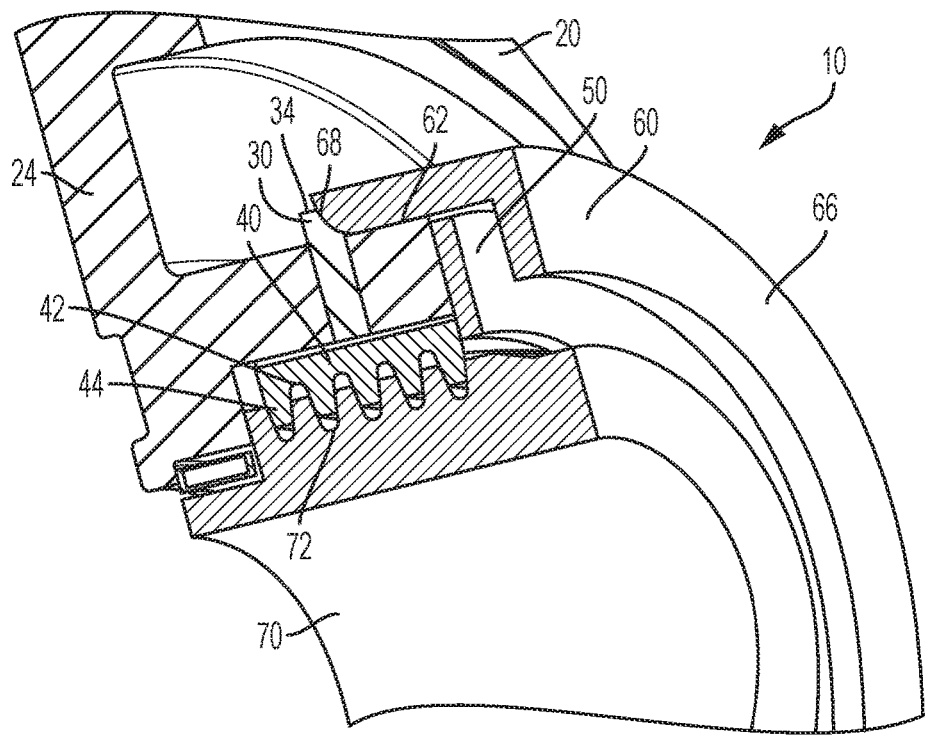
FIG. 2 is a perspective cross-sectional view of the wedge clutch in a locked position in which torque is transferred from a first shaft to a second shaft, according to one embodiment.

Regarding FIGS. 2-3 in particular, the wedge clutch 10 is illustrated in a locked mode. In this mode, the actuating ring 60 is located at a first axial position in which it at most partially radially overlaps with the pawls 30. The pawls remain in a first (e.g., outer) position in which they are not depressed into the gaps 49. The wedge segments 40 are biased into their wedged arrangement via springs 80 which are each connected to two adjacent wedge segments. The springs bias the wedge segments radially inwardly, to maintain the wedge segments 40 wedged between the inner and outer races. Torque can thereby transfer between the inner and outer races in either rotational direction.

Figure 4:
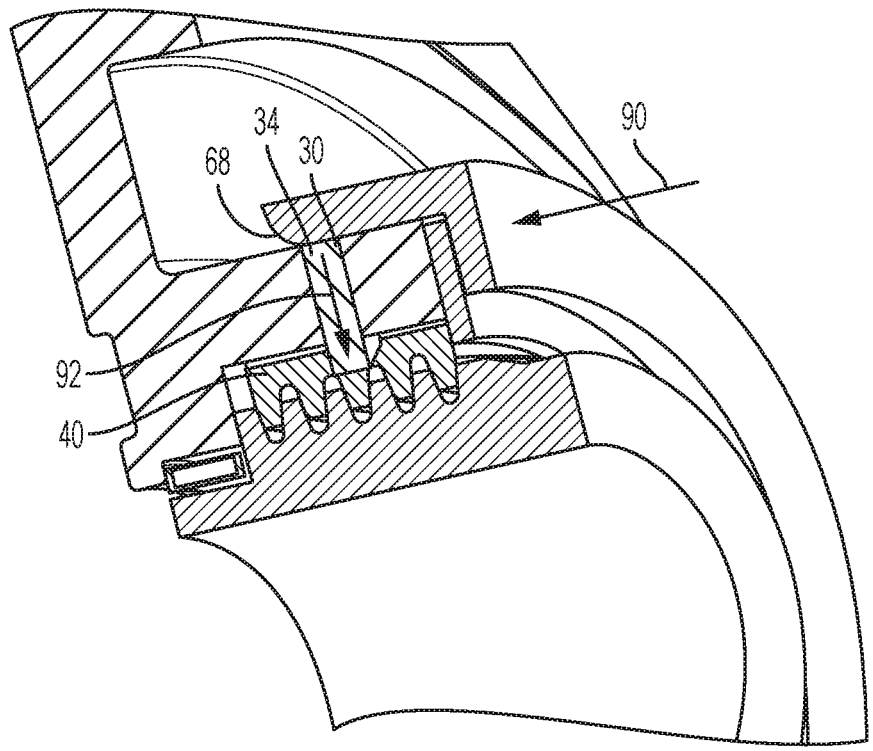
FIG. 4 is a perspective cross-sectional view of the wedge clutch in an unlocked position in which torque is not transferred from the first shaft to the second shaft, according to one embodiment.

Regarding FIGS. 4-5 in particular, the wedge clutch 10 is illustrated in an unlocked mode. In this mode, the actuating ring has been forced to move axially to a second axial position more toward the base 22 of the carrier 20, as indicated by force arrow 90. The tapered surface 34 of the pawl 30 has engaged the tapered end 68 of the actuating ring 60 as the actuating ring 60 has been forced to slide axially along the outer surface 26 of the outer race 24. This forces the pawls 30 radially inwardly into the gaps 49, as indicated by force arrow 92. The tapered inner surfaces 32 of the pawls 30 gradually force the adjacent wedge segments 40 away from one another, as indicated by force arrows 94. This causes the wedge segments 40 to slide radially outwardly along the tapered inner surfaces 28 of the outer race 24. This unwedges the wedge segments 40 from between the inner and outer races, thus unlocking the wedge clutch 10. The clutch is then able to freewheel in at least one rotational direction.

The illustrated embodiment is but one example of the wedge clutch capable of radial actuation of disengagement as disclosed herein. The wedge clutch may be modified in structure while still performing radial actuation within the spirit of this disclosure. For example, the inner surface of the outer race may be cylindrical and include grooves, while the outer surface of the hub may have tapered regions. This would require a reversal of the outer and inner surfaces of the wedge segments; the outer surfaces of the wedge segments would be collectively cylindrical, but the inner surfaces of the wedge segments would be tapered to match the tapered outer surface of the hub.

The switchable wedge clutch of this disclosure can be used in various applications to selectively couple one shaft to another. For example, the switchable wedge clutch can be used to selectively activate an all-wheel drive system, a four-wheel drive system, or the like in which torque is selectively transferred to another axle

PARTS LIST

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

10 wedge clutch
    12 central axis
    20 carrier
    22 base
    23 aperture
    24 outer race
    26 outer surface
    28 inner surface
    29 aperture
    30 pawls
    32 inner surface
    34 outer surface
    40 wedge segments
    42 inner surface
    44 surface features
    46 radially-inward ends
    48 outer surface
    50 cover
    60 actuation ring
    62 inner surface
    64 outer surface
    66 end flange
    68 end surface
    70 hub
    72 grooves
    80 springs
    90 force arrow
    92 force arrow
    94 force arrow While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A switchable wedge clutch comprising:
an inner race extending about an axis and having an outer surface defining a plurality of grooves;
an outer race having an inner surface defining a plurality of tapered regions;
a plurality of wedge segments, each wedge segment having an inner surface moveable within the grooves and circumferentially about the inner race, and each wedge segment having a tapered outer surface configured to engage and slide relative to the tapered regions of the inner surface of the outer race;
a plurality of pawls arranged about the axis and extending through the inner surface of the outer race, each pawl circumferentially aligned with a gap between two adjacent wedge segments; and
an actuating ring having one or more axial extensions, wherein axial movement of the actuating ring causes the one or more axial extensions to force the pawls radially inwardly to separate the two adjacent wedge segments.

2. The switchable wedge clutch of claim 1, wherein the actuating ring is moveable between
a first axial position in which the pawls are in a first radial position and the wedge segments are in a first circumferential position wedged radially between the inner race and outer race to lock the clutch, and
a second axial position in which the one or more axial extensions force the pawls to a second radial position to unwedge the wedge segments between the inner race and outer race to unlock the clutch.

3. The switchable wedge clutch of claim 1, wherein the inner surface of the outer race includes a plurality of apexes and a plurality of valleys located radially outward from the apexes.

4. The switchable wedge clutch of claim 3, wherein the wedge segments slide toward the apexes to lock the switchable wedge clutch, and slide toward the valleys to unlock the switchable wedge clutch.

5. The switchable wedge clutch of claim 1, further comprising a plurality of springs arranged about the axis, each spring coupled to a respective pair of the wedge segments and providing a biasing force to bias the respective pair of wedge segments away from each other.

6. The switchable wedge clutch of claim 1, wherein each pawl includes a tapered outer surface, and the one or more axial extensions include a tapered axial surface that engages the tapered outer surface of the pawl to force the pawls radially inwardly.

7. The switchable wedge clutch of claim 1, wherein the pawls are sized to extend entirely radially through the outer race during radial movement of the pawls.

8. A wedge clutch comprising:
a first race rotatable about an axis and having first tapered surfaces annularly arranged about the axis;
a second race rotatable about the axis and concentric with the first race, the second race having a circumferential groove;
a plurality of wedge segments annularly arranged about the axis, each wedge segment having a second tapered surface contacting one of the first tapered surfaces;
a plurality of pawls extending radially through at least a portion of either the first race or the second race, each pawl circumferentially aligned with a respective gap between two adjacent wedge segments; and
an actuating ring configured to move axially along the axis, wherein axial movement of the actuating ring engages the pawls to force each pawl radially into the respective gap to separate the two adjacent wedge segments.

9. The wedge clutch of claim 8, wherein the actuating ring includes a tapered end, and the pawls each include a tapered outer surface that engages the tapered end to force the pawls radially to separate the two adjacent wedge segments.

10. The wedge clutch of claim 9, wherein the tapered end extends circumferentially about the axis.

11. The wedge clutch of claim 8, wherein the separation of the two adjacent wedge segments unwedges the wedge segments from between the first race and the second race to unlock the clutch.

12. The wedge clutch of claim 8, wherein the pawls each include a radially inward end that is tapered to facilitate a gradual separation of the two adjacent wedge segments.

13. The wedge clutch of claim 8, wherein the actuation ring includes an inner surface circumscribing and slideable along an outer surface of the first race or second race.

14. A wedge clutch comprising:
an inner race having an outer surface defining a circumferential groove;
an outer race having an inner surface defining a plurality of ramped surfaces;
a plurality of wedge segments disposed radially between the inner race and the outer race, wherein two adjacent wedge segments define a gap therebetween, each wedge segment having
a circumferential inner surface configured to slide along the circumferential groove, and
a tapered outer surface configured to slide along a respective one of the ramped surfaces during engagement and disengagement of the clutch;
a plurality of pawls disposed about the wedge segments, each wedge segment axially and radially aligned with a respective one of the gaps; and
an actuator moveable in an axial direction, the actuator having one or more axial end surfaces configured to engage the pawls such that axial movement of the actuator forces the pawls radially inwardly into the gap.

15. The wedge clutch of claim 14, wherein the actuator is moveable between
a first axial position in which the pawls are in a first radial position and the wedge segments are in a first circumferential arrangement wedged between the inner race and outer race to lock the clutch, and
a second axial position in which the one or more axial end surfaces force the pawls to a second radial position radially inward of the first radial position to increase a size of the gap.

16. The wedge clutch of claim 14, further comprising a plurality of springs configured to force the wedge segments radially inwardly along the ramped surfaces of the outer race.

17. The wedge clutch of claim 16, wherein each wedge segment is connected to a respective one of the springs.

18. The wedge clutch of claim 14, wherein the actuator includes an inner surface circumscribing the outer race and slideable along the outer race.

19. The wedge clutch of claim 14, wherein each pawl has a tapered inner surface configured to gradually separate the two adjacent wedge segments.

20. The wedge clutch of claim 14, wherein each pawl has a tapered outer surface configured to engage with a tapered axial end surface of the actuator.

\* \* \* \* \*